United States Patent [19]

Miyazaki

[11] Patent Number: 5,569,857
[45] Date of Patent: Oct. 29, 1996

[54] VEHICLE STRESS DETECTING AND MEASURING METHOD AND STRESS DETECTING DEVICE USING SAID METHOD

[75] Inventor: Nagao Miyazaki, Osaka, Japan

[73] Assignee: Japan Electronics Industry, Limited, Osaka, Japan

[21] Appl. No.: 372,092

[22] Filed: Jan. 13, 1995

[30] Foreign Application Priority Data

Nov. 29, 1994 [JP] Japan .................................. 6-331999

[51] Int. Cl.⁶ ................................................ G01N 3/00
[52] U.S. Cl. ................................ 73/785; 73/819; 73/794
[58] Field of Search .............................. 73/767, 772, 785, 73/794, 819

[56] References Cited

U.S. PATENT DOCUMENTS

| | | | |
|---|---|---|---|
| 4,033,182 | 7/1977 | Clotfelter | 73/772 |
| 4,567,774 | 2/1986 | Manahan et al. | 73/826 |
| 4,895,027 | 1/1990 | Manahan, Sr. | 73/799 |
| 5,022,272 | 6/1991 | Bronowicki et al. | 73/772 |
| 5,186,042 | 2/1993 | Miyazaki | 73/118.1 |

FOREIGN PATENT DOCUMENTS

0611958A2  8/1994  European Pat. Off. .
2810412  9/1979  Germany .

*Primary Examiner*—Richard Chilcot
*Assistant Examiner*—Max Noori
*Attorney, Agent, or Firm*—Jordan and Hamburg

[57] ABSTRACT

The present invention is intended to provide a stress detecting and measuring method wherein in order to measure a shearing strain alone associated with a stress acting in an intended direction, the stress being one of the stresses acting on an axle of a vehicle or a structure having a fixed support point adjacent the axle, the conditions for the optimum position where a stress sensor is to be mounted are indicated. Further, the invention is intended to provide a stress detecting device which accurately measures a shearing strain alone associated with a stress acting in an intended direction by further separating a plurality of stresses acting on a stress sensor. For example, in the case where stresses are applied in two directions to a structure having a fixed support point, in order to measure a shearing strain alone associated with a stress acting in an intended direction, a stress sensor should be mounted in a position which is a transformation knot zone for the other stress strain, i.e., a zone where shearing stress strain is minimum, and which is suitable for measurement of the intended stress.

8 Claims, 4 Drawing Sheets

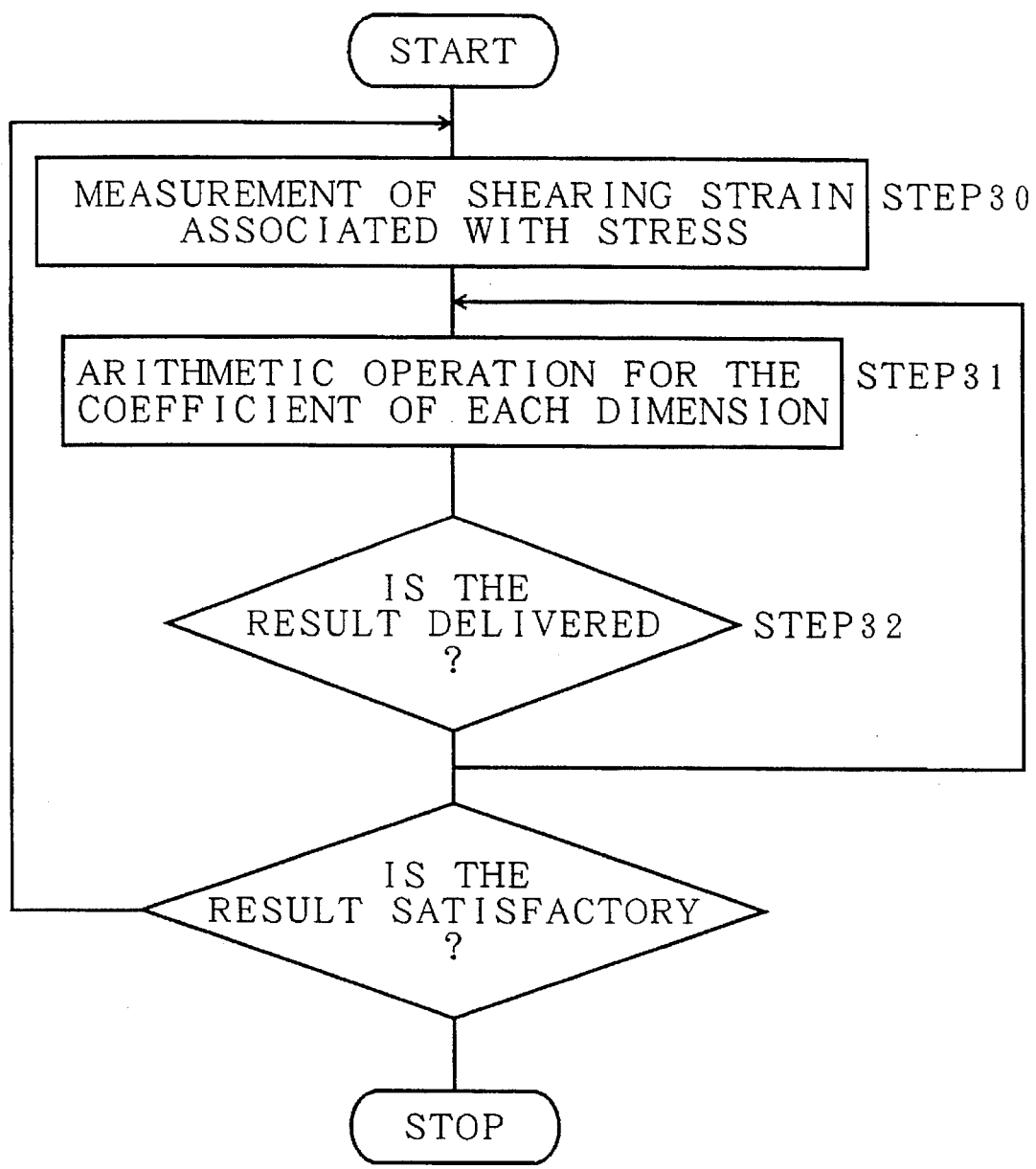

VEHICLE STRESS DETECTING AND MEASURING METHOD AND STRESS DETECTING DEVICE USING SAID METHOD

BACKGROUND OF THE INVENTION

The present invention relates to a stress detecting and measuring method, wherein in order to measure a shearing strain alone associated with a stress acting in an intended direction, said stress being one of the stresses produced in an axle of a vehicle such as a transporting machine, e.g., an automobile, airplane or railroad vehicle, and in a structure having a fixed support point adjacent the axle, the conditions for the optimum position (neutral spot) where a stress sensor is to be mounted are indicated, and it also relates to a stress detecting method and a stress detecting device, adapted to accurately measure a shearing strain alone associated with a stress acting in an intended direction by further separating a plurality of stresses acting on the stress sensor.

As for methods for measuring stresses, strains or the like acting on a transporting machine, such as an automobile, airplane or railroad vehicle, mention may be made of the photoelasticity method, brittle coating method, caustic method, holographic method and strain gauge method, of which generally the strain gauge method has been used most frequently.

The strain gauge method is convenient to use since a variety of strain gauges are available. In this method, a strain gauge is used for stress measurement by being built in a transducer to serve as a stress sensor. If necessary, a plurality of strain gauges are attached to a vehicle or a structure adjacent an axle. In this method, however, the sensor is subjected to the stresses acting on the strain gauge in any direction; therefore, analysis is necessary, and it is difficult to measure a shearing strain alone associated with a stress acting in an intended direction. Few of the stress sensors using strain gauges are capable of cancelling all but one shearing strain acting in an intended direction, and there is no perfect one.

SUMMARY OF THE INVENTION

A conventional stress sensor will detect stresses acting thereon in a plurality of directions; therefore, even if it is desired to detect a shearing strain produced by a stress acting in an intended direction, it has only been possible to detect a stress containing crosstalk acting in another direction. Alternatively, it has been necessary to attach stress sensors in a plurality of locations so as to measure unnecessary stresses by said stress sensors to remove them.

With the above in mind, the present invention provides a stress detecting and measuring method and a stress detecting device wherein in order to detect a stress alone acting in an intended direction, the stress being one of a plurality of stresses acting on a stress sensor in a plurality of directions, the position where the stress sensor is to be mounted on a structure is selected such that it is the position where crosstalks are minimized (the position being referred to as the neutral spot), the neutral spot being obtained from a transformation knot zone with a stress acting in one direction found by utilizing FEM (finite element method).

The present invention is arranged such that the position where a stress sensor for measuring stresses acting on a structure is to be attached is selected such that the directions of all external forces acting on the structure are found and a stress distribution resulting from application of an external force to be measured is investigated while a stress distribution resulting from application of other external forces than the one to be measured is investigated, so as to find the position where the latter stress values are lowest or minimum and an intended stress value to be measured is delivered; thus, the stress sensor is mounted in the position where the latter stress values are lowest or minimum and an intended stress value to be measured is delivered, thereby minimizing the noises such as crosstalk.

According to the invention, the above arrangement effectively decreases the noises such as crosstalk, making it possible to find the intended stress.

The present invention is arranged such that an axle of a vehicle or a structure having a fixed support point adjacent the axle is three-dimensionally graphically represented to perform simulation using the FEM, so as to find the transformation knot zone of stress (a zone where shearing stress strain is minimum, hereinafter the same) in a situation where stresses acting in other directions than the one in which the stress intended to be measured acts are applied to the structure or so as to produce a situation where stresses are simultaneously applied to the structure at a plurality of locations to find transformation knot zones according to the respective stresses, the obtained data on the transformation knot zones being superposed to investigate the neutral spot zone, in which a shearing stress acting in an intended direction is measured.

According to the invention, the above arrangement makes it possible to find the neutral spot zone where crosstalk is minimum, and a stress acting in an intended direction is measured by utilizing the neutral spot.

The present invention is arranged such that in the case where stresses are applied in two directions to an axle of a vehicle or a structure having a fixed support point adjacent the axle, when a shearing strain associated with a stress acting in an intended direction is to be measured, a stress sensor is mounted in a position which is the transformation knot zone for another stress strain and which is necessary or suitable for measuring an intended stress, i.e., a position which is not the transformation knot zone, with the result that stresses acting in unintended directions are not detected because of the positioning in the transformation knot zone but a shearing strain alone associated with a stress acting in an intended direction is measured.

According to the invention, in the case where stresses are applied in two directions to an axle of a vehicle or a structure having a fixed support point adjacent the axle, a shearing strain alone produced by a stress acting in an intended direction is measured. Concretely, two transformation knot zones are found by means of FEM to investigate the neutral spot zone, and a stress sensor will be mounted along this neutral spot zone.

The present invention is arranged such that in the case where stresses are applied in three directions to an axle of a vehicle or a structure having a fixed support point adjacent the axle, when a shearing strain alone associated with a stress acting in an intended direction is to be measured, a stress sensor is mounted in a zone (line or plane) where the transformation knot zone for another stress strain and the transformation knot zone for the other stress strain cross each other, i.e., in a position which is a neutral spot and which is necessary or suitable for measuring an intended stress, i.e., a position which is not the transformation knot zone of intended stresses, with the result that stresses acting in unintended directions are not detected because of the positioning in the transformation knot spot but a shearing strain alone associated with a stress acting in an intended direction is measured.

According to the invention, in the case where stresses are applied in three directions to an axle of a vehicle or a structure having a fixed support point adjacent the axle, a shearing strain alone produced by a stress acting in an intended direction is measured. Concretely, three transformation knot zones are found by means of FEM to investigate the neutral spot zone, and a stress sensor will be mounted along this neutral spot zone.

The present invention is arranged such that in the case where stresses are applied in three directions to an axle of a vehicle or a structure having a fixed support point adjacent the axle, when a shearing strain alone associated with a stress acting in an intended direction is to be measured, a stress sensor is mounted, not two-dimensionally, but three-dimensionally in a zone in which the transformation knot zones for the three directions cross each other, i.e., the neutral spot, or in that spot on the neutral spot zone for the two directions in which a minimum of tensile strain or compressive strain for the remaining one direction is produced (a zone where shearing stress strain is minimum), with the result that stresses in the transformation knot zones are not detected but a shearing strain alone associated with a stress acting in an intended direction is measured.

According to the invention, in the case where stresses are applied in three directions to an axle of a vehicle or a structure having a fixed support point adjacent the axle, stresses acting in unintended directions are not detected because of positioning in the transformation knot spot, and a shearing strain alone associated with a stress acting in an intended direction is measured. Concretely, the required steps are to find the transformation knot zone for the stress component utilizing FEM, to investigate the neutral spot zone, and to mount a stress sensor along this neutral spot zone.

The present invention is arranged such that in the case where a plurality of stresses are applied to an axle of a vehicle or a structure having a fixed support point adjacent the axle, when chiefly a stress acting in an intended direction is to be measured and when the transformation knot zones for three or more directions do not cross each other, and in order to measure a stress in an intended direction, a stress sensor is mounted adjacent a neutral spot zone (a zone where shearing stress strain is minimum) having a resolving power capable of detecting the stress acting in the intended direction. The transformation knot spots for the respective stresses change in a continuous zone resembling a contour line. Therefore, much mixing-in of stresses does not take place even in the vicinity of the transformation knot zone, and a shearing strain alone associated with a stress acting in an intended direction is measured.

According to the invention, in the case where a plurality of stresses are applied to an axle of a vehicle or a structure having a fixed support point adjacent the axle, when the transformation knot zones for three or more directions do not cross each other, stresses acting in unintended directions are not detected since they lie in or adjacent the transformation knot spot or even if they are detected, crosstalks are very few, so that a shearing strain alone associated with a stress acting in an intended direction is measured. Concretely, the required steps are to find the transformation knot zone for the stress component using FEM, to investigate a neutral spot zone where as many transformation knot zones as possible are superposed, and to mount a stress sensor along this neutral spot zone.

The present invention is arranged in order to completely remove crosstalk applied to the stress sensor, the stress sensor is of the one-segment type in which four pressure resistance strain gauges are disposed on the upper and lower surfaces of a sensor board such that they are divided in pairs with the two in each pair crossing each other, so as to selectively measure a stress alone acting in a certain direction or a plurality of stresses.

According to the invention, in a stress detecting device, the employment of a stress sensor of the one-segment type makes it possible to obtain a stress acting in an intended direction since crosstalks are cancelled by the bridge circuit of the stress sensor even if stresses acting in unintended directions are in the vicinity of the transformation knot spot.

The present invention is arranged such that when a stress acting in an intended direction of dimension is to be measured from among the stresses acting on an axle of a vehicle or a structure having a fixed support point adjacent the axle, a plurality of stresses required to find the coefficient of the intended dimension are measured by a stress detecting device, and arithmetic operations are made using the obtained shearing stress strain, so as to obtain the coefficient of the dimension.

According to the invention, the above arrangement makes it possible to obtain the coefficient of the intended dimension.

BRIEF DESCRIPTION OF THE DRAWINGS

FIG. 4 is a flowchart for a method of detecting and measuring the coefficient of each dimension.

DESCRIPTION OF THE PREFERRED EMBODIMENTS

The present invention will now be described as to a stress detecting method as an example with reference to an illustrated embodiment. What is shown herein is an example of a preferred embodiment, and the invention is not limited thereto.

Figure 1:
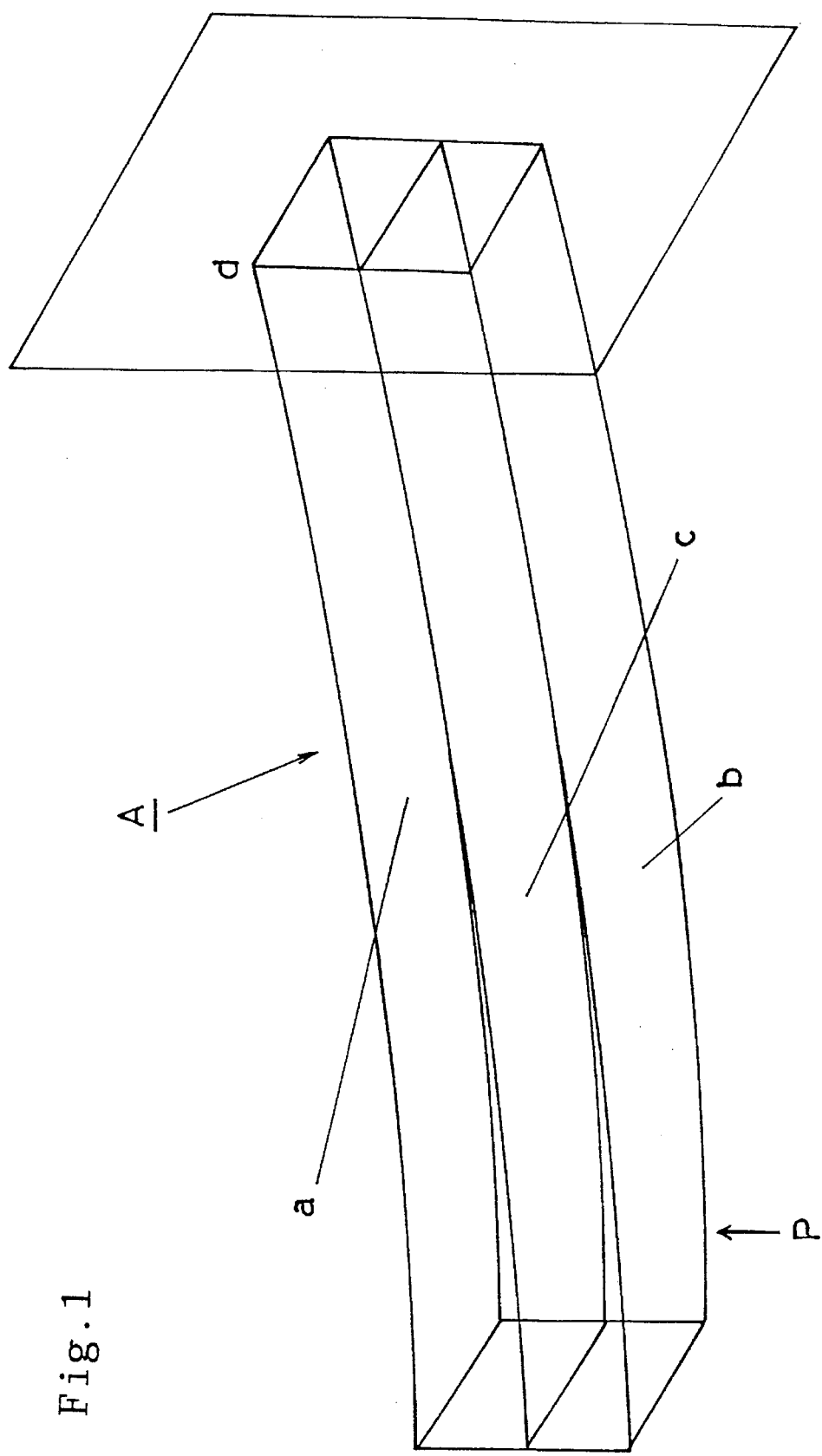
FIG. 1 is a perspective view showing a compressive region, a tensile region and a transformation knot zone in a structure having a fixed support point.

FIG. 1 is a view in which an axle of a vehicle or a structure A adjacent the axle is considered to be a structure having a simple fixed support point (line or plane). When a stress is applied to this structure A in a direction of arrow P, in a stress distribution, a region where a tensile stress is produced with respect to the fixed support point (line or plane) is named b, and a region where a compressive stress is produced is named a. Disposed between these two regions is a region where neither tensile stress nor compressive stress is produced, i.e., a transformation knot zone c (a zone where shearing stress strain is minimum), the region being referred to as the shearing stress zone. The transformation knot zone is a zone where a minimum of shearing stress strain is produced by crosstalk stresses other than an intended stress in an intended direction.

In this transformation knot zone, strain associated with shearing stress is detected with little influences of tensile stress, compressive stress, bending stress, torsion and the like.

Figure 2:
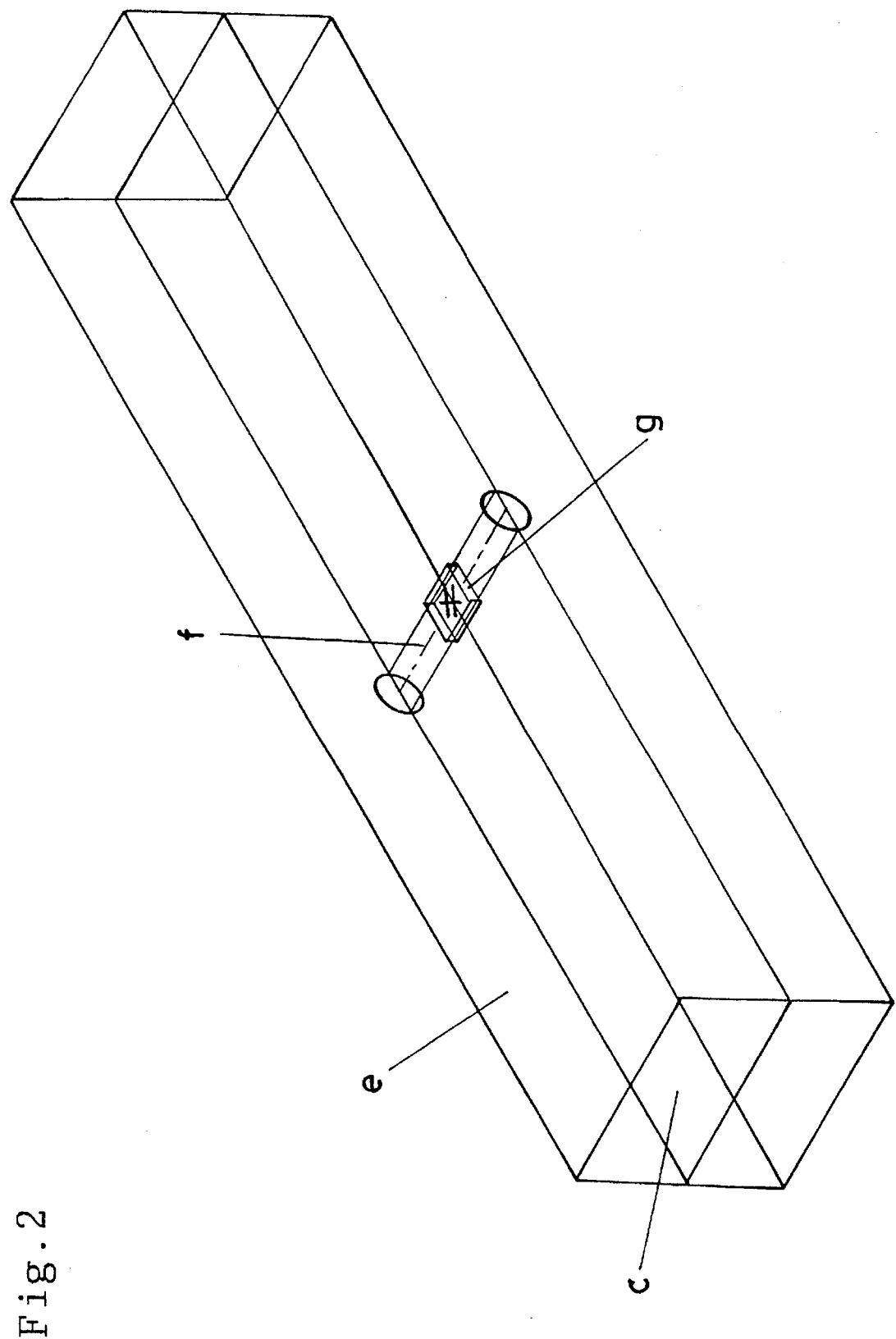
FIG. 2 is a perspective view showing a one-segment stress sensor mounted on a structure having a fixed support point.

FIG. 2 shows a stress sensor g mounted in a hole f formed in the transformation knot zone of the structure e (the zone where shearing stress strain is minimum) or in the shearing stress zone. The position of the stress sensor g horizontally crosses the transformation knot zone of the structure e. Further, the center of the stress sensor crosses the transformation knot zone.

Figure 3:
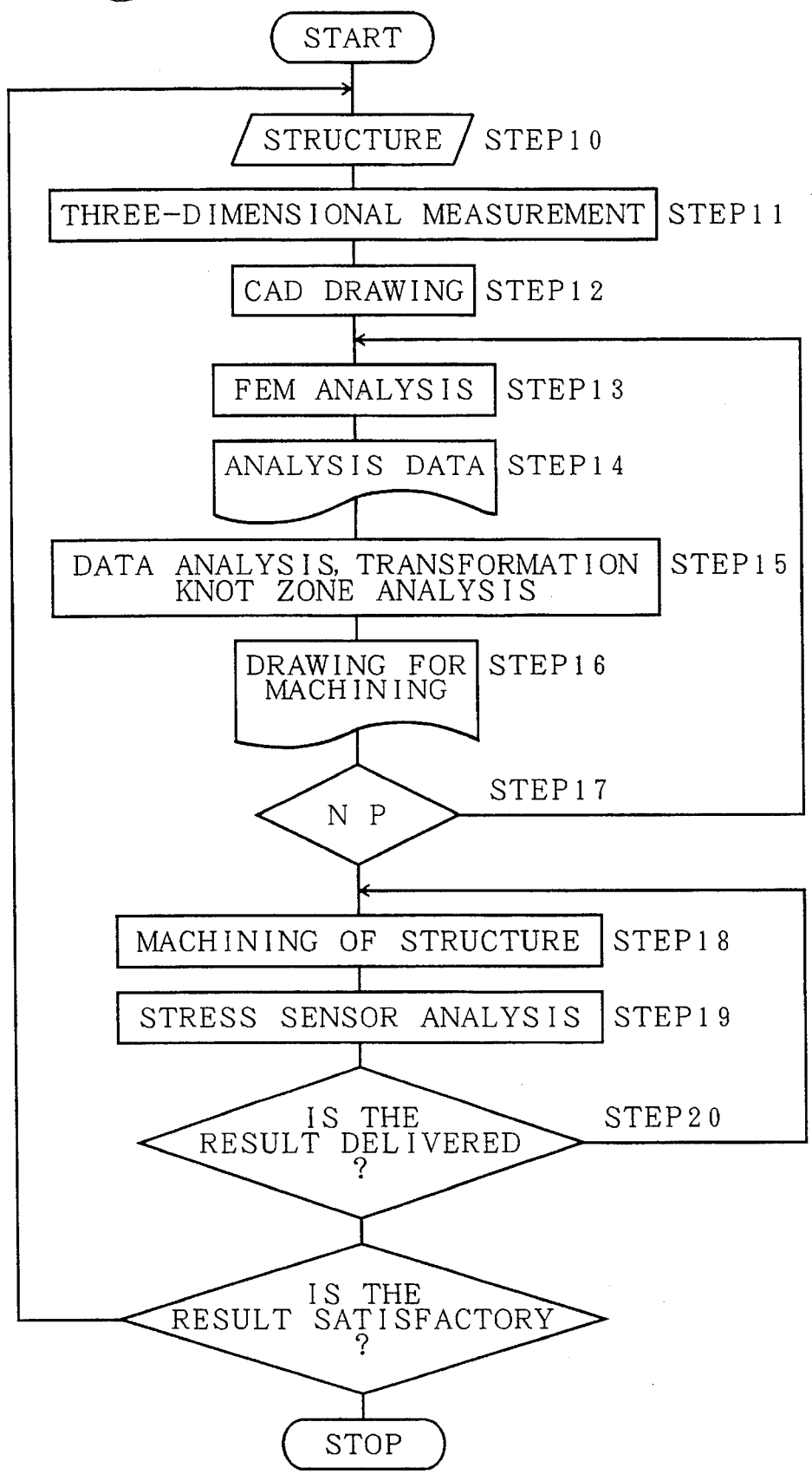
FIG. 3 is a flowchart for a stress detecting and measuring method.

FIG. 3 shows, in the form of a flowchart, the processing according to a vehicle stress detecting and measuring method and a stress detecting device. As for the contents of the operation, at the step 10 a vehicle axle structure on which a stress sensor is to be mounted is selected and then the processing goes to the step 11, where a three-dimensional measurement is made. Then at the step 12, a three-dimensional graph is prepared by using CAD, and subsequently the processing goes to the step 13, where a FEM analysis is made as to the intended stress. Then at the step 14, the analysis data is printed out, and then it goes to the step 15, where an analysis of transformation knot zone is made on the basis of the analysis data. Then at the step 16, the position in which the stress sensor is to be inserted is determined on the basis of the transformation knot zone analysis and a drawing for machining the structure is prepared. Then it goes to the step 17, where an inspection of the machining drawing is made and if it is found faulty, the processing goes back to the step 13, where an FEM analysis is made again, followed by a transformation knot zone analysis on the basis of the analysis data. If the machining drawing is found faultless, the processing goes to the step 18, where the structure is drilled on the basis of the machining drawing. Then at the step 19, the stress sensor is inserted in the hole in the structure on the basis of the machining drawing. And at the step 20, if appropriate data is obtained from the stress sensor, this routine ends here.

In addition, the stress sensor used is of a one-segment type, disclosed in the present applicant's Japanese Patent Application No. 130840/91 (Japanese Patent Kokai No. 331336/92), corresponding to U.S. Pat. No. 5,186,042, in which four strain gauges are disposed on the opposed upper and lower surfaces of a board such that they are divided in pairs with the two in each pair crossing each other, the stress sensor being mounted in a hole formed in a structure, the strain gauges being built in a bridge circuit, whose output is arithmetically processed. The stress produced in the structure is transmitted to the strain gauges of pressure resistances through the stress sensor board, so that the strain gauges change in resistance. The resistance change of strain gauges has a regularity depending upon the direction of stress, and logical operations are made by making use of this regularity, so as to find the shearing stress acting in the intended direction.

FIG. 4 shows a flowchart for processing the arithmetic operation of the coefficient in the intended direction of dimension. As for the contents of operation, at the step 30 a shearing strain not influenced by crosstalks is measured through the stress sensor inserted in the structure. Then the processing goes to the step 31, where the coefficient of each dimension is computed from the data on the shearing strain associated with stress. Then it goes to the step 32, where if the result of the operation is proper, this routine ends.

The above embodiment has been described with reference to a vehicle; however, the invention can be used for stress measurement for general structures.

According to the present invention, even in an axle of a vehicle or a complicated structure, such as one disposed adjacent the axle, a shearing strain alone associated with a stress acting in an intended direction is detected and measured by making an FEM analysis of stresses acting in a plurality of directions and detecting the neutral spot zone. Therefore, it is possible to accurately measure stresses acting on an axle of a vehicle or a structure adjacent the axle, such as road surface friction forces, transverse forces, vertical loads, brake torques, driving torques, road surface friction coefficients and the like, which will not be influenced by crosstalk. Thus, the invention, if applied to control for anti-lock brake devices or traction control devices for vehicles, remarkably improves the reliability of necessary input signals and enables a quick and accurate control decision to be made under any road condition, thereby bringing about a remarkable improvement in the performance of anti-lock brake devices and traction control devices. Further, even if the neutral spot zone is not detected in a perfect form, the present stress sensor can be satisfactorily used even in the vicinity of the transformation knot spot. Further, the employment of a one-segment type stress sensor makes it possible to detect a shearing strain alone associated with a stress acting in an intended direction without including crosstalks.

What is claimed is:

1. A vehicle stress detecting and measuring method for measuring a stress of interest in a structure due to an external force to be measured, comprising the steps of:

determining directions of extraneous external forces acting on the structure;

determining a stress distribution resulting from application of said external force to be measured using a known direction of said external force to be measured;

determining a stress distribution resulting from application of said extraneous external forces using said directions of said extraneous external forces;

finding a position in said structure where stress values due to said extraneous external forces are lowest or minimum and said stress of interest of said external force to be measured exists; and mounting a stress sensor in said position to minimize noise due to crosstalk sensed by said stress sensor.

2. A vehicle stress detecting and measuring method for measuring a stress of interest in a structure which is one of an axle of a vehicle or a support structure of an axle having a fixed support point adjacent the axle, comprising the steps of:

creating a three dimensional graphic model of said structure;

performing finite element modeling simulation on said three dimensional graphic model including:

simulating extraneous stresses acting on said structure in directions other than a direction in which the stress of interest acts;

finding transformation knot zones of respective ones of said extraneous stresses; and superimposing data on the transformation knot zones to investigate a neutral spot zone in which said extraneous stresses are minimized; and disposing a stress sensor at said neutral spot zone to measure said stress of interest.

3. A vehicle stress detecting device for detecting a stress of interest due to a force in a first direction while an extraneous stress due to a force in a second direction exists, the stress detecting device comprising:

a structure having a fixed support point; and a stress sensor is mounted in said structure at a position which is a transformation knot zone of said extraneous stress and at which said stress of interest exists, whereby only a shearing strain associated with said stress of interest is measured.

4. A vehicle stress detecting device for measuring a shearing strain of a stress of interest due to a force in a first direction while second and third stresses due to forces in second and third directions exist, the detecting device comprising:

a structure having a fixed support point;

a stress sensor is mounted in said structure at a position where transformation knot zones for said second and third stresses cross each other defining a neutral spot and at which said stress of interest exists, whereby only a shearing strain produced by said stress of interest is measured.

5. A vehicle stress detecting device for measuring a shearing strain of a stress of interest due to a force in a first direction while second, third and fourth stresses due to forces in second, third and fourth directions exist, the detecting device comprising:

a structure having a fixed support point;

a stress sensor mounted in said structure in a zone in which transformation knot zones for the second and third stresses cross each other defining a neutral spot and in which a minimum of tensile strain or compressive strain due to said fourth stress in said fourth direction is produced defining a zone where shearing stress strain is minimum, whereby a shearing strain alone produced by the stress of interest is measured.

6. A vehicle stress detecting device for measuring shearing strain due to a stress of interest in the presence of a plurality of stresses, comprising:

a structure having a fixed support point and being subject to said stress of interest and said plurality of stress such that transformation knot zones for said plurality of stress acting in three or more directions do not cross each other; and a stress sensor mounted in said structure adjacent a neutral spot zone where shearing stress strain due to said plurality of stresses is minimum and said stress sensor has a resolving power capable of detecting the stress of interest acting in an intended direction, whereby a only a shearing strain associated with the stress of interest is measured.

7. A vehicle stress detecting device according to any one of claims 3–6 wherein said stress sensor of a one-segment type in which four pressure resistance strain gauges are disposed on upper and lower surfaces of a sensor board such that they are divided in pairs with the strain gauges in each pair crossing each other, so as to selectively measure only a stress acting in a certain direction or a plurality of stresses.

8. A vehicle stress detecting device according to any one of claims 3–7 for measuring a stress of interest acting in an intended direction of dimension from among extraneous stresses wherein a plurality of stresses required to find a coefficient of the intended direction of dimension are measured by said sensor and arithmetic operations are made using measured shearing stress strain, so as to obtain the coefficient of said direction of dimension.

* * * * *